United States Patent
Slapak et al.

(10) Patent No.: US 10,473,761 B2
(45) Date of Patent: Nov. 12, 2019

(54) WIRE AND PYLON CLASSIFICATION BASED ON TRAJECTORY TRACKING

(71) Applicant: RODradar Ltd., Rinatya (IL)

(72) Inventors: Alon Slapak, Mazor (IL); Shai Segal, Ramat-Gan (IL)

(73) Assignee: RODRADAR Ltd., Rinatya (IL)

( * ) Notice: Subject to any disclaimer, the term of this patent is extended or adjusted under 35 U.S.C. 154(b) by 404 days.

(21) Appl. No.: 15/234,282

(22) Filed: Aug. 11, 2016

(65) Prior Publication Data
US 2018/0045814 A1    Feb. 15, 2018

(51) Int. Cl.
| | |
|---|---|
| *G01S 7/41* | (2006.01) |
| *G01S 13/66* | (2006.01) |
| *G01S 13/93* | (2006.01) |
| *G01S 13/44* | (2006.01) |
| *G01S 13/72* | (2006.01) |
| *G01S 13/94* | (2006.01) |

(52) U.S. Cl.
CPC .......... *G01S 7/412* (2013.01); *G01S 13/4454* (2013.01); *G01S 13/66* (2013.01); *G01S 13/726* (2013.01); *G01S 13/9303* (2013.01); *G01S 13/94* (2013.01)

(58) Field of Classification Search
CPC ...... G01S 7/412; G01S 13/4454; G01S 13/66; G01S 13/726; G01S 13/9303; G01S 13/94
USPC .......................................................... 342/29
See application file for complete search history.

(56) References Cited

U.S. PATENT DOCUMENTS

| | | | | | |
|---|---|---|---|---|---|
| 5,566,074 | A | * | 10/1996 | Hammer | G01S 13/9303 340/961 |
| 5,798,942 | A | * | 8/1998 | Danchick | G01S 3/7864 342/36 |
| 6,122,572 | A | * | 9/2000 | Yavnai | G05D 1/0088 342/13 |
| 7,764,808 | B2 | * | 7/2010 | Zhu | G06T 7/20 382/103 |
| 7,886,646 | B2 | * | 2/2011 | Bannasch | F41H 3/00 89/1.11 |
| 8,253,564 | B2 | * | 8/2012 | Lee | G06K 9/00771 340/541 |

(Continued)

OTHER PUBLICATIONS

Alves M. A., Peixoto G. G and Rezende M. C., "Simulations of the radar cross section of a pylon"; www.sige.ita.br/anais/IXSIGE/Artigos/GE_19.pdf.

(Continued)

*Primary Examiner* — Timothy A Brainard
*Assistant Examiner* — Nuzhat Pervin
(74) *Attorney, Agent, or Firm* — Heidi Brun Associates Ltd.

(57) ABSTRACT

A trajectory tracking system includes a set of dynamic models, a trajectory database, a trajectory handler, a parameter extractor and a classifier. There is one dynamic model per expected obstacle type and it models an expected trajectory of a point of normal incidence (PNI) of the expected obstacle. The trajectory database stores trajectories for a current set of obstacles being tracked. The trajectory handler at least associates incoming detections to existing trajectories and to update the existing trajectories. The parameter extractor periodically extracts parameters from the trajectories and the classifier classifies obstacles associated with the trajectories at least based on the parameters of the trajectories and on associated the dynamic models for the trajectories.

24 Claims, 10 Drawing Sheets

(56) References Cited

U.S. PATENT DOCUMENTS

| | | | | |
|---|---|---|---|---|
| 8,452,448 | B2* | 5/2013 | Pack | G06N 3/008 700/245 |
| 8,706,414 | B2* | 4/2014 | Funk | G01C 21/165 340/995.19 |
| 8,838,374 | B2* | 9/2014 | Tan | G01C 21/165 340/995.25 |
| 9,632,502 | B1* | 4/2017 | Levinson | G01S 7/4972 |
| 9,734,455 | B2* | 8/2017 | Levinson | G05D 1/0088 |
| 2003/0014165 | A1* | 1/2003 | Baker | G05D 1/104 701/3 |
| 2003/0189512 | A1* | 10/2003 | Chen | G01S 13/5244 342/160 |
| 2004/0178943 | A1* | 9/2004 | Niv | G01S 13/50 342/29 |
| 2004/0234136 | A1* | 11/2004 | Zhu | G06K 9/3241 382/224 |
| 2009/0254217 | A1* | 10/2009 | Pack | G06N 3/008 700/246 |
| 2010/0207762 | A1* | 8/2010 | Lee | G06K 9/00771 340/541 |
| 2010/0332125 | A1* | 12/2010 | Tan | G01C 21/165 701/408 |
| 2011/0205359 | A1* | 8/2011 | Lee | G08B 13/19608 348/143 |
| 2011/0231016 | A1* | 9/2011 | Goulding | G06N 3/008 700/246 |
| 2014/0112546 | A1* | 4/2014 | Lee | G08B 13/19608 382/107 |
| 2015/0123836 | A1* | 5/2015 | Niv | H01Q 1/28 342/27 |
| 2015/0178620 | A1* | 6/2015 | Ascari | G06N 3/049 706/21 |
| 2015/0323932 | A1* | 11/2015 | Paduano | G05D 1/042 701/3 |
| 2015/0338505 | A1* | 11/2015 | Oshima | G01S 7/28 342/107 |
| 2016/0132728 | A1* | 5/2016 | Choi | G06K 9/6215 382/103 |
| 2017/0123419 | A1* | 5/2017 | Levinson | G01S 7/4972 |

OTHER PUBLICATIONS

Berg, J.-E.; Ruprecht, J.; de Week, J.-P.; and Mattsson, A., "Specular Reflections from High-Rise Buildings in 900 MHz Cellular Systems", in Vehicular Technology Conference, 1991. Gateway to the Future Technology in Motion., 41st IEEE, pp. 594-599, May 19-22, 1991.

Bizup, D.F. and Brown D.E., "The over-extended Kalman filter—don't use it!", in: Proceedings of the Sixth International Conference of, vol. 1, 2003, pp. 40-46.

Boers Y. and Driessen J. N., "Particle filter based detection for tracking"; In Proceedings of the American Control Conference, pp. 4393-4397, Arlington, VA, USA, Jun. 2001.

Brookner, Eli. "Tracking and Kalman filtering made easy". New York: Wiley, 1998.

Brown G. S., "Special Issue on LowGrazing-Angle Backscattering from Rough Surfaces", IEEE Transactions on Antennas and Propagation, vol. 46, No. 1, Jan. 1998.

Chen Penghui; Xu Xiaojian; and Jiang Yuesong, "Comparison of Methods to Extract Target Scattering from Scattering of Target-Metal Pylon Combination", in 2014 International Radar Conference, pp. 1-6, Oct. 13-17, 2014.

Deori B. And Thounaojam D. M., "A Survey on Moving Object Tracking in Video", in International Journal on Information Theory (IJIT), vol. 3, No. 3, pp. 31-66, Jul. 2014.

Dwight L. Jaggard and Xiaoguang Sun, "Scattering from fractally corrugated surfaces", J. Opt. Soc. Am. A, vol. 7, No. 6 1131-1139, Jun. 1990.

Kotsiantis, "Supervised Machine Learning: A Review of Classification Techniques", Informatica, vol. 31, pp. 249-268, Jul. 2007.

Miller et al., "Radar Cross Section of a Long Wire", IEEE Transactions on Antennas and Propagation, pp. 381-384, May 1969.

Primet, M., and Moisan, L., "Point tracking: an a-contrano approach", Preprint MAP5 No. 2012-06 (2012).

Qiu C., Zhang Z., Lu H., and Luo H., "A Survey of Motion-Based Multitarget Tracking Methods", Progress in Electromagnetics Research B, vol. 62, 195-223, 2015.

Rappaport, T.S.; Seidel, S.Y., "900 MHz multipath propagation measurements in four United States cities", in Electronics Letters, vol. 25, No. 15, pp. 956-958, Jul. 20, 1989.

Ristic B., Arulampalam S., and Gordon N., "Beyond the Kalman Filter: Particle Filters for Tracking Applications". Artech House Radar Library, 2004.

Roy R., Paulraj A., and Kailath T., "Estimation of Signal Parameters via Rotational Invariance Techniques—Esprit", Nineteenth Asilomar Conference on Circuits, Systems and Computers, pp. 83-89, 1985.

Rupesh Kumar Rout, "A Survey on Object Detection and Tracking Algorithms". Department of Computer Science and Engineering National Institute of Technology Rourkela—769 008, India, Jun. 2013.

Schmidt, Ralph O. "Multiple Emitter Location and Signal Parameter Estimation". IEEE Transactions on Antennas and Propagation, 34(3):276-280, Mar. 1986.

Sezgin M., and Sankur B. "Survey over image thresholding techniques and quantitative performance evaluation". Journal of Electronic Imaging 13 (1), 146-165, Jan. 2004.

Streit Roy L., "Tracking on Intensity-Modulated Data Streams". Technical Report 11,221, NUWC, Newport, Rhode Island, USA, May 2000.

Yilmaz Alper, Javed Omar, and Shah Mubarak, "Object Tracking: A Survey", ACM Computing Surveys, vol. 38, No. 4, Article 13, Publication date: Dec. 2006.

International Search Report for corresponding PCT application PCT/IL2017/050877 dated Nov. 28, 2017.

* cited by examiner

WIRE AND PYLON CLASSIFICATION BASED ON TRAJECTORY TRACKING

FIELD OF THE INVENTION

The present invention relates to obstacle warning radar generally.

BACKGROUND OF THE INVENTION

Target tracking or object tracking is a family of algorithms which are used in a range of applications. One branch of this family is the point-based tracking in which objects are represented by points, contrary to the two other typical branches: kernel-based tracking and silhouette-based tracking.

In point-based tracking, shown in FIG. 1 to which reference is now made, the input to the point-based tracking algorithm 14 is often the raw data 10 from one or more sensors after adequate preprocessing 12, and is habitually termed snapshots. This is a stream of D-dimensional arrays, indexed by the acquisition time t. A vector of indices, $p \in \square^D$, of an array element is a position, and a series of positions $\{p(t)\}_{t=1}^T$, indexed by the acquisition time t is termed a trajectory and is the output of the point-based tracking algorithm 14.

The point-based tracking algorithm 14 is composed of a detection mechanism 16 to detect the objects in every snapshot, and an association mechanism 18 to associate the objects to trajectories. The detection 16 is generally performed using thresholding, while employing deterministic or probabilistic tools. The association 18 is typically divided into three methods: Kalman filter (KF), particle filter (PF) and multiple hypothesis tracking (MHT), which generally track across snapshots by evolving the objects' state (e.g., object position and motion).

For example, in radar applications, the raw data received from the antennas normally undergoes manipulations, such as frequency conversion to baseband, matched filtering, Fourier transform and modulus (a.k.a. absolute value) to create a Range-Doppler map (RDM), which is a 2-dimensional real-positive-valued array with indices $R_{min} \leq r \leq R_{max}$ and $V_{min} \leq v \leq V_{max}$ indicating the range and the Doppler velocity of each cell. The detection stage 16 is often based on thresholding, either a static or a dynamic one, where cells with a modulus exceeding a certain threshold over the neighbourhood is detected as an object. For example, assuming such an object in a cell which is described by a vector of indices $p(t) = [r(t) \ v(t)]^T \in \mathbb{R}^2$, where r(t) and v(t) are, respectively, the range and the Doppler velocity at time t, the trajectory $\{[r(t) \ v(t)]^T\}_{t=1}^T$ is the output of the point-based tracking algorithm.

SUMMARY OF THE PRESENT INVENTION

There is therefore provided, in accordance with a preferred embodiment of the present invention, a trajectory tracking system. The system includes a set of dynamic models, a trajectory database, a trajectory handler, a parameter extractor and a classifier. There is one dynamic model per expected obstacle type and it models an expected trajectory of a point of normal incidence (PNI) of the expected obstacle. The trajectory database stores trajectories for a current set of obstacles being tracked. The trajectory handler at least associates incoming detections to existing trajectories and to update the existing trajectories. The parameter extractor periodically extracts parameters from the trajectories and the classifier classifies obstacles associated with the trajectories at least based on the parameters of the trajectories and on associated the dynamic models for the trajectories.

Moreover, in accordance with a preferred embodiment of the present invention, the trajectory handler includes a detector/estimator, a matchmaker and an extended Kalman filter. The detector/estimator provides the incoming detection. The matchmaker grows, freezes, kills and starts trajectories according to the incoming detections, wherein new trajectories are generated from the dynamic models for incoming detections not associated with an existing trajectory. The extended Kalman filter updates each existing trajectory provided by the matchmaker.

Further, in accordance with a preferred embodiment of the present invention, the obstacles are at least wires, pylons and clutter.

Still further, in accordance with a preferred embodiment of the present invention, the system also includes a detector/estimator to extract a list of detections of objects from a set of Range-Doppler maps (RDMs).

Moreover, in accordance with a preferred embodiment of the present invention, each model of the set of dynamic models includes a state vector including at least the position of the obstacle relative to the radar in a 3-dimensional space, the Doppler velocity of the PNI, the polarization of the return wave and the intensity of the return wave.

Further, in accordance with a preferred embodiment of the present invention, the trajectories include boolean flags indicating the status of the trajectory.

Still further, in accordance with a preferred embodiment of the present invention, the parameters are direct parameters measured by the detector/estimator and improved by the extended Kalman filter.

Moreover, in accordance with a preferred embodiment of the present invention, one of the parameters is the azimuth of the obstacle whose final value is determined by the extended Kalman filter as a weighted function at least of the initial measurement and of past measurements via the dynamic model of the obstacle.

Further, in accordance with a preferred embodiment of the present invention, the parameters are indirect parameters extracted from elements of the state vector.

Still further, in accordance with a preferred embodiment of the present invention, the indirect parameters are at least one of: the relative height of the obstacle with respect to the radar, the true azimuth of the obstacle, an elevation of the obstacle and a target signature of the obstacle.

Moreover, in accordance with a preferred embodiment of the present invention, the matchmaker includes an ambiguity resolver to resolve ambiguities in measurements.

Further, in accordance with a preferred embodiment of the present invention, the classifier includes a parameter reviewer to utilize the target signature against a database of target signatures to determine a class of an obstacle.

Still further, in accordance with a preferred embodiment of the present invention, the extended Kalman filter includes an outlier rejection test to reject a measurement update when a measurement deviates from expected values by more than a positive multiple of a standard deviation of the trajectory.

There is also provided, in accordance with a preferred embodiment of the present invention, a trajectory tracking method including having a set of dynamic models, one per expected obstacle type, of an expected trajectory of a point of normal incidence (PNI) per expected obstacle, storing trajectories for a current set of obstacles being tracked, associating incoming detections to existing trajectories, updating the existing trajectories, periodically extracting parameters from the trajectories, and classifying obstacles associated with the trajectories at least based on the parameters of the trajectories and on associated the dynamic models for the trajectories.

Moreover, in accordance with a preferred embodiment of the present invention, the method also includes providing the incoming detection, growing, freezing, killing and starting trajectories according to the incoming detections, wherein new trajectories are generated from the dynamic models for incoming detections not associated with an existing trajectory, and updating each existing trajectory provided by the matchmaker.

Further, in accordance with a preferred embodiment of the present invention, the method also includes extracting a list of detections of objects from a set of Range-Doppler maps (RDMs).

Still further, in accordance with a preferred embodiment of the present invention, the associating includes resolving ambiguities in measurements.

Moreover, in accordance with a preferred embodiment of the present invention, the classifying includes utilizing the target signature against a database of target signatures to determine a class of an obstacle.

Finally, in accordance with a preferred embodiment of the present invention, the updating includes rejecting a measurement update when a measurement deviates from expected values by more than a positive multiple of a standard deviation of the trajectory.

BRIEF DESCRIPTION OF THE DRAWINGS AND APPENDIX

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
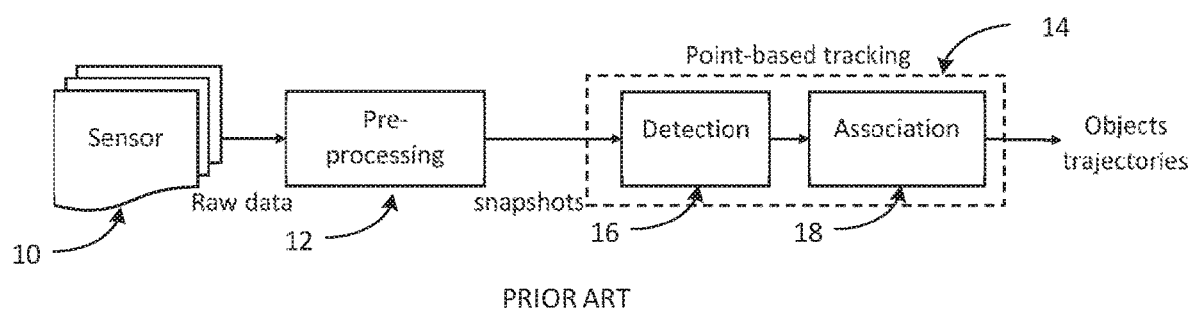
FIG. 1 is a block diagram illustration of a prior art object tracking system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that, for an obstacle warning radar (OWR) that is mounted on a helicopter and observing stationary targets, which are termed "obstacles" henceforth, it is possible to classify obstacles, and especially wires and pylons, and to distinguish them from clutter using their "dynamic model". In general, objects are divided into static and dynamic objects with respect to the ground. The dynamic-models of static obstacles originate only from the motion of the radar, whereas the dynamic-models of dynamic obstacles result from both the radar movement and the motion of the obstacle. As a result, the dynamic-model of an obstacle, as is inferred by the tracking algorithm, is a favorable discriminating factor between static obstacles and dynamic obstacles, and in some cases, between dynamic obstacles of different types. Moreover, the dynamic models can discriminate between obstacles and clutter, and thus, may be used to suppress false alarms.

In the context of wire and pylon detection for low-altitude flying aircrafts, the present invention estimates the apparent trajectory of the obstacle relative to the radar, classifies the type of obstacle from several prior hypotheses including non-obstacle hypotheses which will be used to reject false alarms, estimates indirect underlying parameters which characterize the obstacle and cannot be extracted directly from the raw detections, and attempts to improve the accuracy of the estimation of the direct parameters of the obstacles, which are extracted directly from the raw detections.

To discuss the difference between static and dynamic obstacles, we first introduce the term point of normal incidence (PNI) which is a point on an object from which the transmitted wave is reflected back to the receiver. It is similar to the specularity of a wire when illuminated by an RF wave whose wavelength is large compared with the wire diameter. In this case, the wire has a high specularity, which means that the majority of the energy from an incident wave would be reflected at an angle equal to the incidence angle, but mirrored around its normal. Research in the fields of radar cross-section (RCS) measurement techniques and cellular communication have shown a large amount of specular reflection in the high wavelength range also from point obstacles such as pylons, towers and buildings.

Considering a thin straight wire illuminated by an RF wave, the receiver of the radar receives echoes from a single point on the wire only—the PNI—which is the point at which the normal to the wire from the radar intersects the wire.

Figure 2:
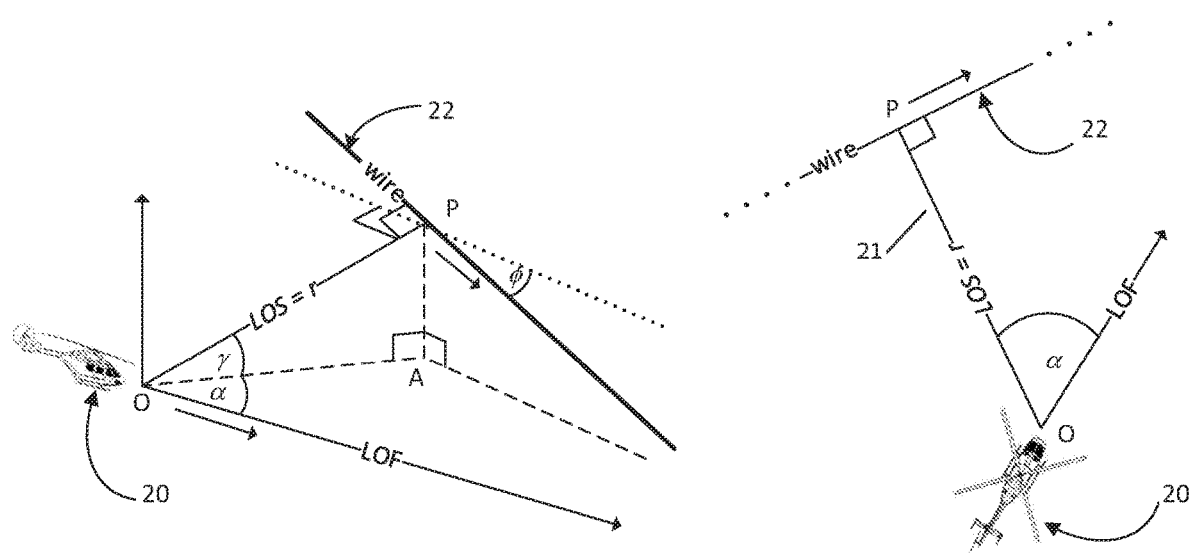
FIG. 2 is a schematic illustration showing a helicopter approaching a wire, from the side and from above.

Reference is now made to FIG. 2, which illustrates a helicopter 20 approaching a wire 22. FIG. 2 is not to scale for illustration purposes. The position of the PNI is denoted by P, and the position of helicopter 20 is denoted by O. The wire 22 is shown with a bold line for clarity; its actual radius might be significantly smaller with respect to helicopter 20. The line connecting P and O is the line-of-sight (LOS), and the direction of helicopter motion is the line-of-flight (LOF). The left-hand side figure shows the constellation in a 3-d space and the right-hand plot shows the constellation from top-view. The azimuth angle $\alpha$, elevation angle $\gamma$ and the length of the LOS r determine the position P of the PNI in the space, relative to the helicopter motion. The angle $\phi$ describes the polarization of the wire, that is, the angle between the wire and its projection on the horizontal space, and completes the information required to draw the wire 22 in the 3-d space relative to the helicopter 20. In other words, $(r,\alpha,\gamma)$ are the 3 polar coordinates which suffice to determine the position of the PNI, which is a point, in the 3-d space relative to the helicopter. To complete the exposition of the wire, which is a line passing through the PNI, two more angles are given: the polarization $\phi$ and the right angle between the LOS and the wire, which are implied by the specularity of the reflection. Summing up, owing to specularity, the 4-tupple $(r,\alpha,\gamma,\phi)$ conveys full information on the position of the wire in the 3-d space relatively to the helicopter.

Figure 3:
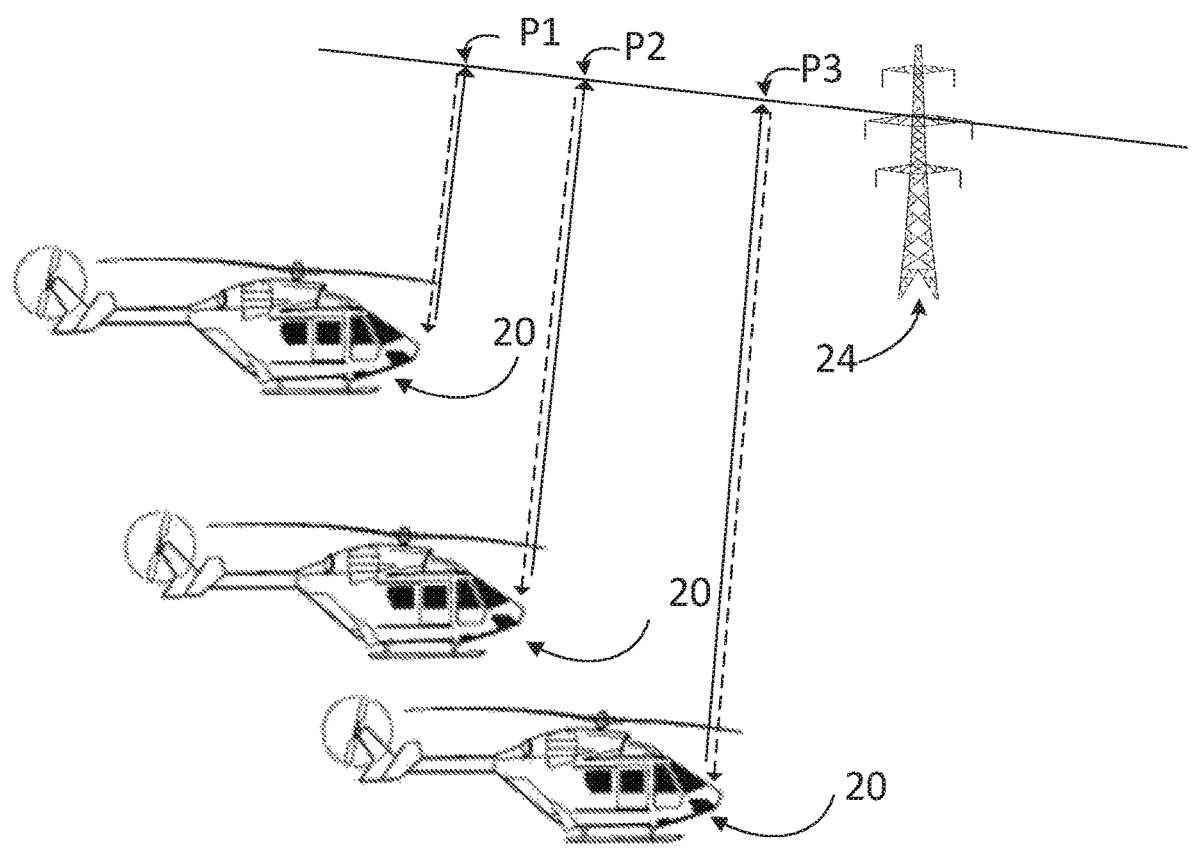
FIG. 3 is a schematic illustration of a helicopter approaching a wire and the resulting point of normal incidence (PNI) of the wire for 3 different positions of the helicopter.

As the helicopter 20 moves, and with it the radar on the helicopter 20, a normal 21 from the helicopter 20 to the wire 22 moves too, except for situation in which the radar moves directly along the normal to the wire. Consequently, the PNI moves as the radar moves, namely, the PNI of a wire behaves as a dynamic obstacle. In FIG. 3, to which reference is now briefly made, the PNI of the wire is shown for 3 different positions of the helicopter, each with its own PNI, denoted P1, P2 and P3.

Figure 4:
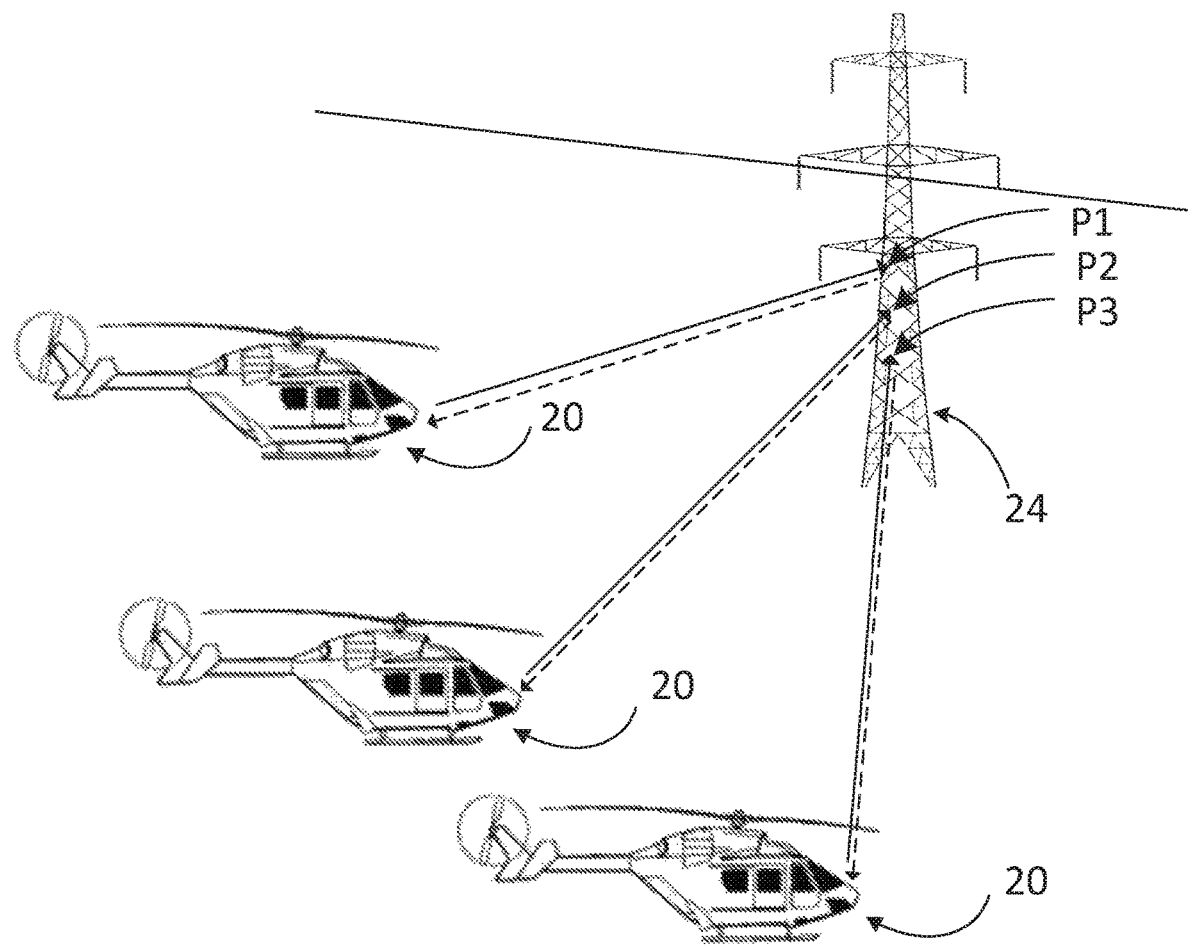
FIG. 4 is a schematic illustration of a helicopter approaching a pylon and the resulting PNI of the pylon for 3 different positions of the helicopter.

Unlike wires, the PNI of a pylon is static in the inertial coordinate system. This is because of the typical geometrical structure of point obstacles, which contain some surfaces that are normal to the radar in almost any direction. In FIG. 4, to which reference is now briefly made, there is a pylon 24 residing in the field of view (FOV) of the radar, where the radar is at a level somewhere midway of the pylon height. The pylon 24 backscatters the incidence RF wave, whatever the angle between the radar and the pylon is, and the position P of the PNI does not change much, even as the helicopter 20 approaches the pylon 24. For clarity, the PNI for 3 three different positions of the helicopter are denoted P1, P2 and P3, where these 3 points might reside at the same position or at very similar positions.

Figure 5:
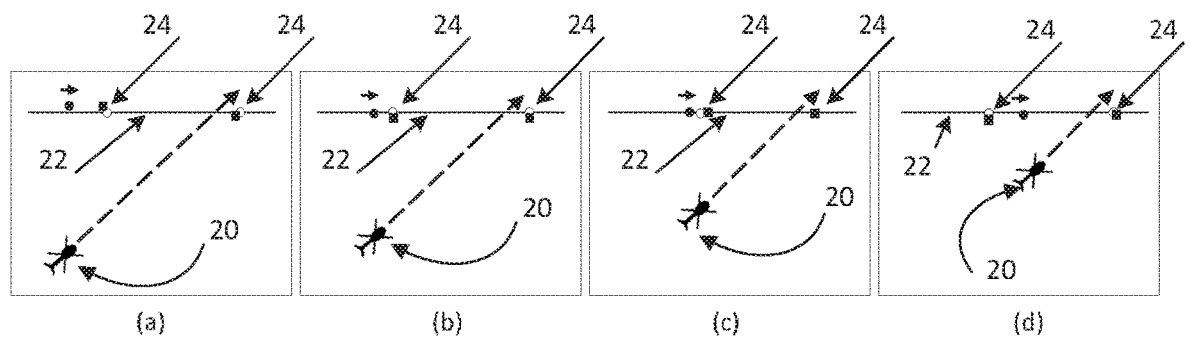
FIG. 5 is a schematic illustration of a helicopter moving toward two pylons between which a wire is stretched.

The dynamics of the PNIs are therefore heavily dependent upon the obstacle type. Reference is now made to FIG. 5 which shows a top view of a radar on a helicopter 20 moving toward pylons 24 (denoted with open circles) between which a wire is stretched. Assuming a broad beam radar (installed on a helicopter), so that the wire and the pylons are within the FOV of the radar, when the radar moves in the direction of the dashed line, the PNI of the wire (solid circles) moves along the wire as the normal from the radar to the wire moves, whereas the PNI of the two pylons (solid squares) are substantially static in their positions.

The dynamic-model of clutter, such as might also be visible when viewing the wires and pylons, is more complicated, and is affected by a range of factors, such as the defining parameters of the surface, landscape, the carrier frequency of the radar signal and the polarization of the wave. However, in many cases, the dynamic-model of clutter is not kinematically admissible, and this fact can serve as a discriminating factor between obstacles and clutter.

Figure 6:
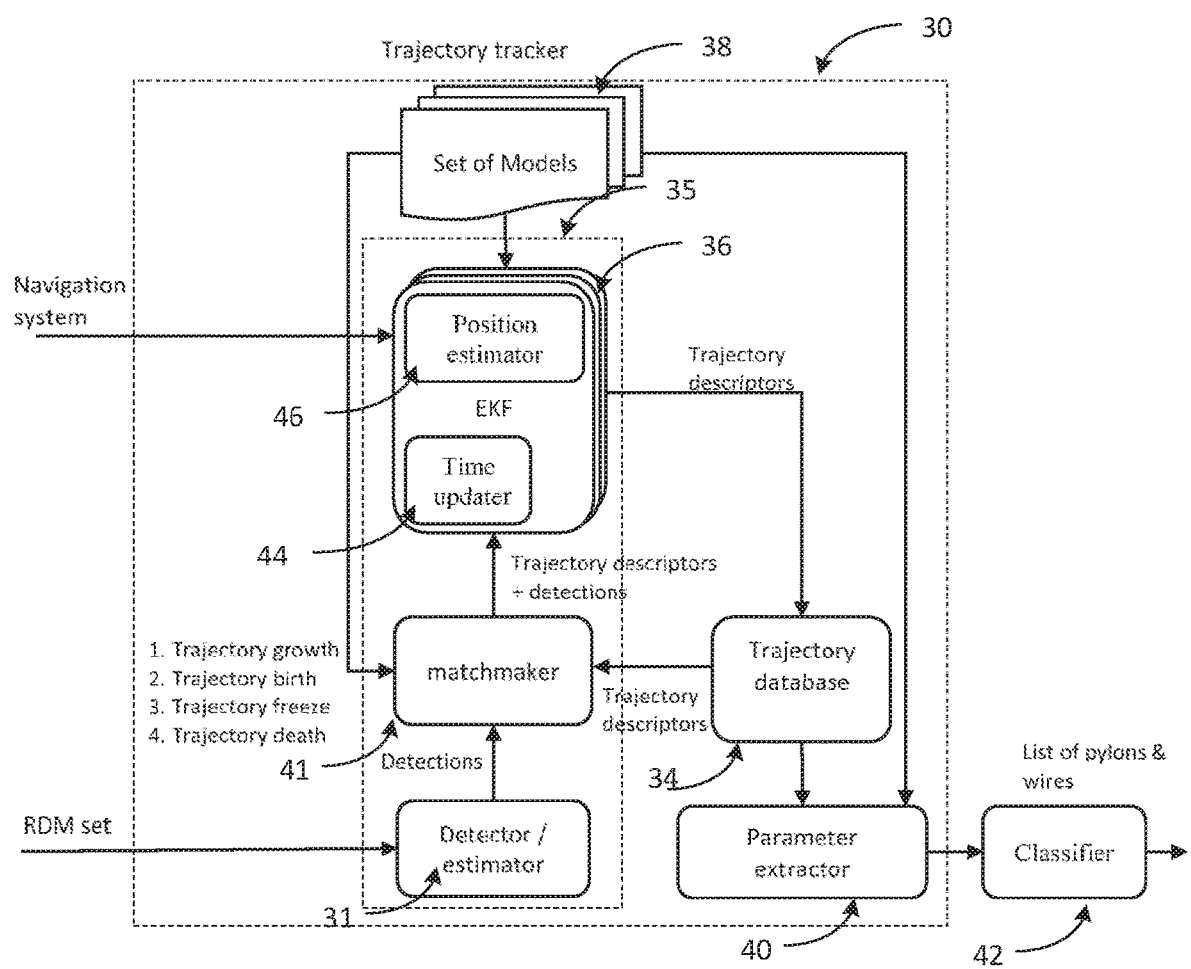
FIG. 6 is a block diagram illustration of a trajectory tracking system, constructed and operative in accordance with a preferred embodiment of the present invention.

FIG. 6, to which reference is now made, illustrates a trajectory tracking system 30 to associate every detected object in the sequence of snapshots to an existing or new trajectory, and to classify the object based on a dynamic model of the trajectory, where trajectories may have different characteristics for wires, for pylons (or other point obstacles) and for sporadic clutter.

Trajectory tracking system 30 may comprise a trajectory database 34, a trajectory handler 35, a set of models 38, a parameter extractor 40 and a classifier 42. Trajectory handler 35 may comprise a detector/estimator 31, a matchmaker 41 and an extended Kalman filter (EKF) 36. EKF 36 may comprise a time updater 44 and a position estimator 46.

As noted by the Wikipedia entry on extended Kalman filters (en. wikipedia. org/wiki/Extended_Kalman_filter), a Kalman filter has a state transition equation and an observation model. The state transition equation, for a discrete calculation, is:

$$x_k = f(x_{k-1}, u_k) + w_k \tag{1}$$

And the observation model, for a discrete calculation, is:

$$z_k = h(x_k) + v_k \tag{2}$$

where $x_k$ is the state vector, $u_k$ is a vector of external inputs, such as the control inputs from the navigation system, $w_k$ and $v_k$ are the process and observation noises;

Time updater 44 of the extended Kalman filter may predict the next state with prediction equations and position estimator 46 may update the variables by comparing the actual measurement with the predicted measurement, using the following type of equation:

$$y_k = z_k - h(x_{k|k-1}) \tag{3}$$

where $z_k$ is the measurement from the RDMs and $y_k$ is the error between the measurement and the predicted measurement.

In tracking system 30, each trajectory may begin as a model from the set of models 38, where each model may be a dynamic model reflecting the temporal behavior of one type of obstacle or PNI. The time-based dynamic model may be expressed by a per-obstacle-type vector function $f_{type}(x(t), u(t), t)$, whose inputs may be past state vectors $x(t)$ (either one state vector or more), and any external inputs $u(t)$ which affect the dynamics of the PNI. The elements of state vector $x(t)$ may quantitatively describe the status of the PNI at some given time t. For example, a state vector of a PNI of an obstacle might include, inter alia, the position of the obstacle relative to the radar in a 3-dimensional space, the Doppler velocity of the PNI, the polarization of the return wave and the intensity of the return wave. The vector function $f_{type}(x(t), u(t), t)$ may be used to predict the state-vector $x(t)$ at some given time $t+1$ ahead of the current time.

An exemplary realization of the dynamic model in the EKF 36 may include the time update equation (a.k.a. prediction equation) as is described in the book "Lessons in Digital Estimation Theory" by Jerry M. Mendel, which is incorporated herein by reference. The prediction equation of EKF 36 is governed by a per-obstacle-type state-vector model as follows:

$$\dot{x}(t) = f_{type}[x(t), u(t), t] \tag{4}$$

Considering, for example, that helicopter 20 moves on a straight line with a constant velocity $V_0$, and define, for example, a 4-tuple state-vector:

$$x(t) \triangleq [r(t)v(t)\alpha(t)\gamma(t)]^T \in \mathbb{R}^4 \quad (5)$$

where r(t) is the range of the PNI from the helicopter at time t, v(t) is the Doppler velocity of the PNI with respect to the helicopter at time t, $\alpha(t)$ is the azimuth of the PNI with respect to the helicopter's line of flight at time t, and $\gamma(t)$ is the height of the PNI with respect to the helicopter's line of flight at time t. Denote also the k-th element of the state-vector x(t) by $x_k$.

An exemplary state-vector model for the PNI of a horizontally stretched wire may be:

$$\dot{x}_{wire} = \begin{bmatrix} x_2 \\ \frac{V_0^2}{x_1} \cdot (\sin^2(x_3) + \cos^2(x_3) \cdot \sin^2(x_4)) \\ 0 \\ \frac{V_0}{x_1} \cdot \cos(x_3) \cdot \sin(x_4) \end{bmatrix} \in \mathbb{R}^4 \quad (6)$$

An exemplary function for the PNI of a pylon may be:

$$\dot{x}_{pylon} = \begin{bmatrix} x_2 \\ \frac{V_0^2}{x_1} \cdot (\sin^2(x_3) + \cos^2(x_3) \cdot \sin^2(x_4)) \\ \frac{V_0 \cdot \sin(x_3)}{x_1 \cdot \cos(x_4)} \\ \frac{V_0}{x_1} \cdot \cos(x_3) \cdot \sin(x_4) \end{bmatrix} \in \mathbb{R}^4 \quad (7)$$

It will be appreciated that other functions for the PNI of the wires and the pylons may be utilized instead of equations 5, 6 and 7, and are included in the present invention.

The time update equation, which may be implemented in 44 in EKF 36 may be formulated for the discrete time case using matrix multiplication, or, for the continuous time case, as a set of differential equations. Also, the dynamic model may be linear with respect to the input vectors or non-linear with respect to the input vectors.

It will be appreciated that the dynamic models of the PNI of distinct types of obstacles are different. In other words, the dynamic model of the PNI of a wire may differ from the dynamic model of a PNI of a pylon, or of building or of a terrain feature. The set of models 38, therefore, may contain the dynamic models of any type of observable obstacle.

Figure 7:
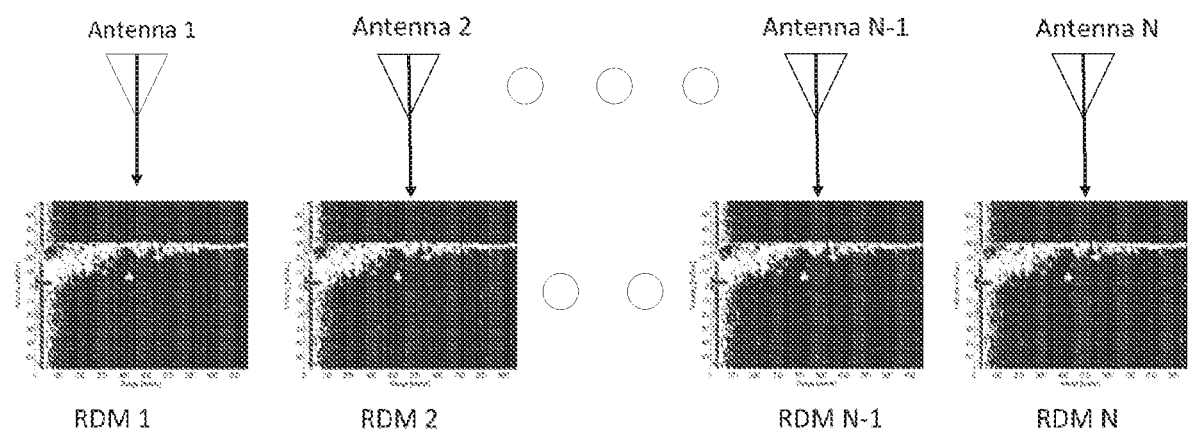
FIG. 7 is an illustration of an exemplary set of Range-Doppler maps (RDMs), useful in understanding the system of FIG. 6.

The input to trajectory tracking system 30 may be a set of RDMs received from the preprocessor 12 by detector/estimator 31. An exemplary set of RDMs are shown in FIG. 7, to which reference is now briefly made. Each RDM provides the input from a single port of the receiving array antenna, where a receiving array antenna may have N ports. Note that all RDMs of a set relate to the same time interval beginning at time $t_0$. As is known in the art, the detector/estimator 31 may extract a list of detections of objects from the set of RDMs. Each detection may be described by a set of parameters such as the range, Doppler velocity, azimuth angle, and polarization orientation.

Tracking system 30 may maintain a list of existing trajectories in trajectory database 34, where each trajectory of which may be associated with an obstacle within the radar's FOV or, more precisely, the PNIs within the radar's FOV. Each trajectory may be described by a 'trajectory descriptor' which includes a set of parameters from which the trajectory can be evolved further, and from which the obstacle characteristic may be extracted.

The matchmaker 41 may receive the list of detections from detector/estimator 31 together with the list of trajectories which already exist in the trajectory database 34. The matchmaker 41 may fit each detection to one of the existing trajectories, may write the matched detection in the trajectory descriptor, and may send the updated trajectory to the EKF 36.

It might happen, of course, that there will be trajectories with no matched detection, such as when an obstacle is no longer in the FOV of the radar and cannot be observed directly. In this case, tracking system 30 may keep following the trajectory for a predefined time, so as to withstand effects of temporary or short-term concealment of a target. If the time duration over which no detection was assigned to this trajectory is shorter than a predefined time, matchmaker 41 may mark the trajectory descriptor as "frozen", to be treated by inspection only with no supporting detection. Matchmaker 41 may affect this by setting boolean flags within the trajectory descriptors before forwarding them to the EKF 36. If the elapsed time duration is longer than the predefined time, then matchmaker 41 may not provide the trajectory descriptor to EKF 36 and may remove it from the trajectory database 34.

It might also happen that there will be detections which are not assigned to any trajectory. For example, when the system starts, the trajectory database 34 may be empty, and thus, all the first detections will not be assigned to any trajectory. In this case, the matchmaker 41 may prepare one 'trajectory descriptor' for each of the models forming part of the set of models 38, for example, a descriptor for a wire and a descriptor for a pylon. These initial trajectories will be moved to the EKF 36. Unless the PNI is at the same position for both a wire and a pylon, only one of the initial trajectories will be correct. The algorithm will follow each of the trajectories, and the wrong one is expected to die after a short time during which no detection will be matched to it.

The EKF 36 may receive the trajectory descriptors and may evolve each of the trajectories based on boolean flags in its associated trajectory descriptor, as described in more detail hereinbelow. The EKF 36 may also use data from the navigation system of the helicopter 20, such as the helicopter velocity, acceleration and heading. The evolved trajectories may be stored in the trajectory database 34 for the next operation.

The parameter extractor 40 may monitor the trajectory database 34 and may extract an augmented set of parameters for each obstacle whose trajectory is stored therein from the descriptor of each of the trajectories. It will be appreciated that, since the descriptors contain parameters which result from the EKF operation, often, some of the parameters are not observed directly in the measurements.

The classifier 42 may review the per obstacle parameters and may determine the type of object those parameters indicate. One of the facts that classifier 42 may utilize may be the type of dynamic model, from set of models 38, to which the trajectory matched.

In detail, the input to detector/estimator 31 may be a sequence of RDMs (each is equipped with a time stamp), which is supplied by the preprocessor 12. The output of detector/estimator 31 may be a list of potential detections; each endowed with a set of parameters, termed 'direct parameters' hereinafter.

The operation of the 'detector' part might be based on some thresholding method, for example, by detecting those entries of the RDM with a magnitude which exceeds some threshold value. The threshold might be a fixed arbitrary value, or a dynamic one to meet a pre-specified optimization criterion, such as constant false alarm rate (CFAR).

The operation of the 'estimator' part is to estimate a set of direct parameters for each detection. This set contains the range, Doppler velocity, azimuth angle, and polarization orientation, and may be estimated by various known estimation algorithms, such as maxima-finding for the range and Doppler velocity, and MUSIC (MUltiple SIgnal Classification), described by Ralph O. Schmidt in his article "Multiple emitter location and signal parameter estimation", *IEEE Transactions on Antennas and Propagation,* 34(3): 276-280, March 1986 and ESPRIT (Estimation of Signal Parameters via Rotational Invariance Techniques) as described by A.; Roy, R.; Kailath, T. in their article "Estimation Of Signal Parameters Via Rotational Invariance Techniques—Esprit", Nineteenth Asilomar Conference on Circuits, Systems and Computers, pp. 83-89, 1985, for the azimuth angle and polarization orientation.

Matchmaker 41 may receive a list of detections from detector/estimator 31, and a list of descriptors, which specify the trajectories already maintained by trajectory tracking system 30, from trajectory database 34. A trajectory descriptor is a set of parameters which contains, inter alia, the dynamic model type, its underlying parameters and the boolean flags which indicate the status of the trajectory. The output of matchmaker 41 may be a list of detections and their assignments to a trajectory descriptor, either an already existing trajectory or a new one.

Figure 8:
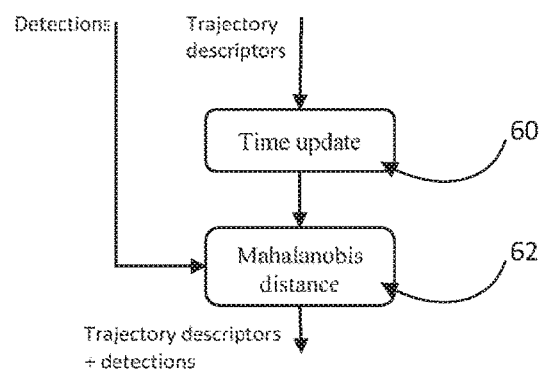
FIG. 8 is a schematic illustration of a prediction-based matching operation, useful in understanding the system of FIG. 6.
Figure 8:
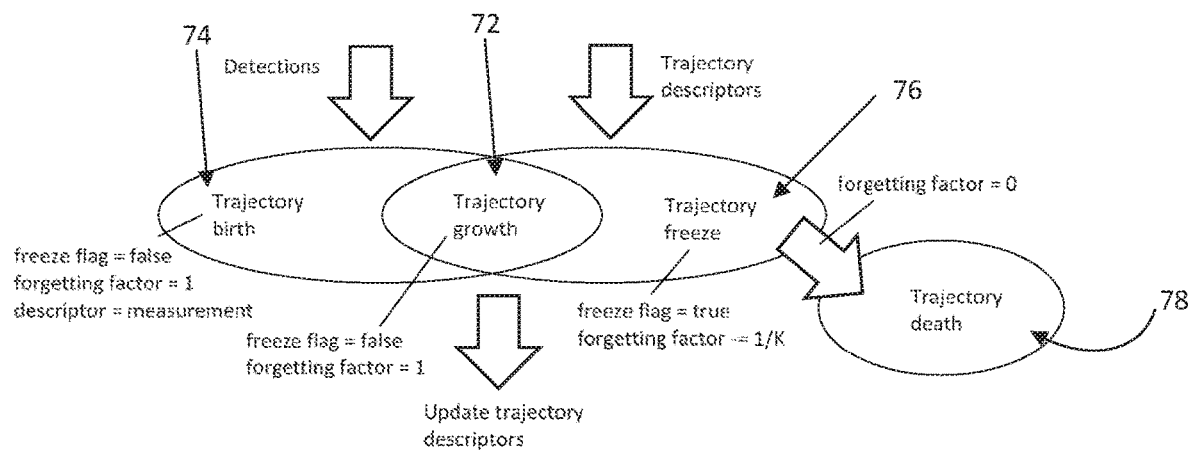

Matchmaker 41 may first try to match each detection to an existing trajectory. This may be done using metric based methods, such as the nearest neighbor or maximum likelihood. FIG. 8 shows an example of a prediction-based matching. First, time updater 44 may update (step 60) each of the trajectory descriptors according to the time update equations of a Kalman filter, provided in Appendix 1, so as to predict the expected position of the trajectory at time t. The time update equations also produce a covariance matrix K(k+1) of the prediction error, which in turn, may be used to improve geometric minimum-distance-based matching, as the distance along an eigenvector of the matrix K associated with a larger eigenvalue is virtually shorter than the distance along an eigenvector of the matrix K associated with a smaller eigenvalue. This is known as the Mahalonobis distance, determined in step 62. The detection having the largest eigenvalue to a trajectory is then matched to the trajectory. The outcome of this stage are three lists: (i) detection-trajectory pairs (from step 72); (ii) trajectories without appropriate detections (from step 76); and (iii) detections with no matched trajectories (from step 74), all of which are described in more detail hereinbelow.

Figure 9:
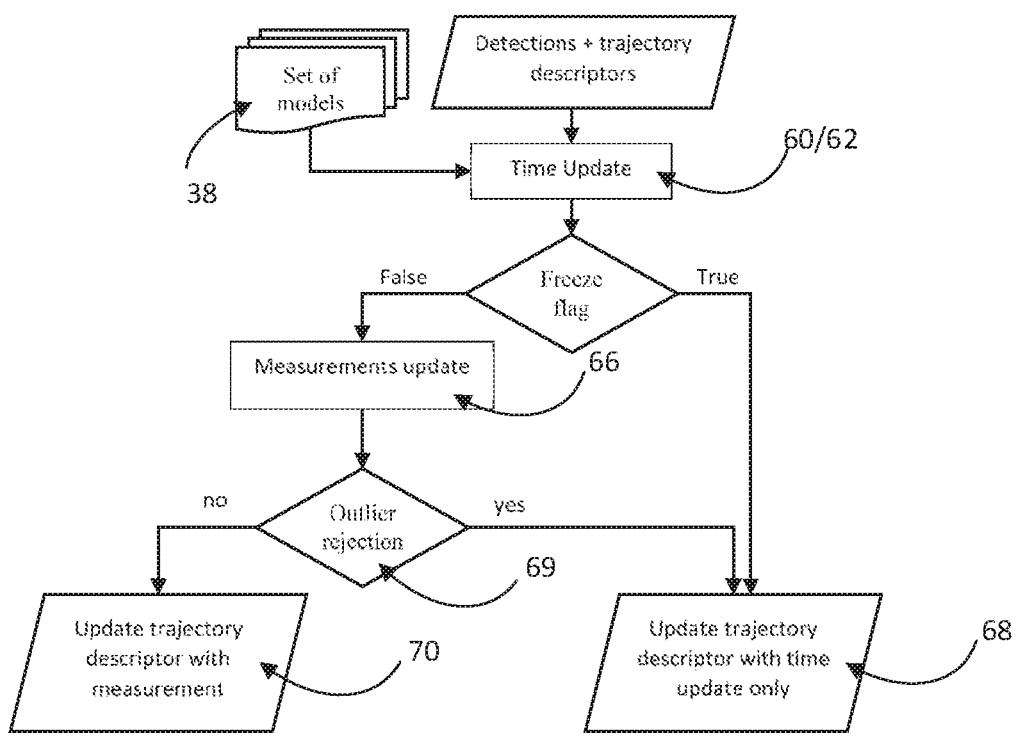
FIG. 9 is a flow chart illustration of an update operation of an extended Kalman filter, forming part of the system of FIG. 6.

In the second stage, as detailed in FIG. 9 to which reference is now made, matchmaker 41 may update the descriptor of each trajectory based on the results from the first stage (steps 60 and 62). Two fields in the trajectory descriptor facilitate this stage, a boolean freeze flag and a forgetting factor. The freeze flag is false when a detection is matched to a trajectory, in which case, EKF 36 may update (step 70) the trajectory using both measurements (step 66) and time update equations (steps 60 and 62), but only after removing (step 69) "outliers" (values which are above or below a threshold). The freeze flag is true when no detection was matched to this trajectory, in which case, EKF 36 may update (step 68) the trajectory using the time update equations only. The forgetting factor is a counter which counts towards zero from some MAX_TIME parameter describing the maximum allowable time for a trajectory to be maintained without matched detection. Upon reaching zero, the trajectory is removed from the trajectory backlog. Summing up and referring back to FIG. 8, the operation of matchmaker 41 may be divided into four operations:

Trajectory growth 72: Detections which were assigned to an existing trajectory are used for updating (growing) the assigned trajectory. In this case, the output of matchmaker 41 is a descriptor fortified by the assigned detection. Also, the freeze flag and the forgetting factor are set to 'false' and 'MAX_TIME' respectively.

Trajectory birth 74: the remaining detections, which were not associated with any of the existing trajectories, initiate new trajectories by creating new trajectory descriptors, one for each of the models in the set of models 38, with the detection as the first position for each new trajectory.

In addition, as a remedy to the well-known ambiguity in azimuth, which is described hereinbelow, matchmaker 41 may initiate a trajectory for each legitimate value in an azimuth look up table (LUT), so that the number of new trajectories is the product of the number of models in the set of models 38 and the number of legitimate azimuth values in the azimuth LUT.

For each new descriptor, the freeze flag and the forgetting factor are set to 'false' and 'MAX_TIME' respectively.

Trajectory freeze 76: trajectories which are not assigned to any detection might happen because of several reasons, e.g.: (i) this is not a true obstacle but a false alarm, (ii) the obstacle departs from the FOV of the radar, (iii) obscuring of the object by ground features or land cover, and (iv) a misdetection. In this case, Matchmaker 41 may set the freeze flag to true, and may decrease the forgetting factor field by the time elapsed from the last RDM.

Trajectory death 78: When the forgetting factor reaches zero, that is, once MAX_TIME has elapsed since the last detection that was matched to this trajectory, the trajectory descriptor is removed from trajectory database 34, and is not sent to EKF 36.

The objective of EKF 36 is to update the trajectory descriptors. EKF 36 may receive the list of detection-trajectory pairs from matchmaker 41. The detections serve as measurements $z_t$ for the measurement-update equation, such as equation 3, of EKF 36, and the trajectory descriptor describes the dynamic model to which these measurements are assigned. EKF 36 also receives data from the navigation system of helicopter 20, which form part of external inputs $u_t$ of EKF 36. Using the measurements $z_t$, the control vector $u_t$ and the dynamic model (from equation 4) of the trajectory, EKF 36 may update the state vector $x_t$ which resides in the trajectory descriptor. A pointer in the trajectory descriptor indicates which dynamic model from the set of predetermined dynamic models 38 was utilized for the current trajectory.

The EKF equations, the time update and the measurement update are slightly different for linear and non-linear dynamic model equations, and for discrete time and continuous time evolution. However, these sets of equation are well known to those skilled in the art and can be found extensively in the literature.

Also, EKF 36 may operate according to the boolean flag freeze flag in the trajectory descriptors that are set by matchmaker 41, as described hereinabove:

As shown in FIG. 9, when the freeze flag is 'true', EKF 36 may update the descriptor without adding any new measurements. That is, it may predict the position of the obstacle based only on the previous data and the time stamp and only using the time update equations.

When the freeze flag is 'false', EKF 36 may calculate the measurement update equations using the matched detection.

EKF 36 may also perform an outlier rejection test (step 69) based on the ratio between the value of the "innovation" (a.k.a. residual) and a standard deviation of the estimated state vector of the trajectory. When the innovation exceeds some multiple of the standard deviation, EKF 36 may reject the measurement update and may update the trajectory using only the time update equations. This may act to avoid deviating the trajectory due to mismatching wrong detections. Wrong detections, or outliers, may be identified based on the deviation from the expected values by more than a multiple of the standard deviation of the trajectory.

Parameter extractor 40 may review the descriptors of the trajectories in the trajectory database and may output a list of obstacles in the radar FOV, appended with a set of parameters (direct or indirect) which are extracted from the trajectory descriptors.

Direct parameters may include parameters that are also instantaneously derived by detector/estimator 31. However, the estimation of these parameters from the trajectory descriptors are often improved over time, as EKF 36 updates these parameters over time, and thus, the parameter values found in the trajectory descriptors may be more accurate.

For example, the measured azimuth of the obstacle might be corrupted by temporary interference that degrades the SNR, in which case, the measured azimuth might deviate from the true one. As the azimuth is one of the underlying parameters of the model, and is one of the entries of the state vector, EKF 36 may improve the estimation by weightedly combining the noisy measurement, the past measurements (which might be more accurate), and other parameters which affect the azimuth via the dynamic model of the obstacle. As a result, parameter extractor 40 may output the azimuth value from the state vector, which is part of the trajectory descriptor, instead of the instantaneously measured one.

Indirect parameters may include a set of parameters which are involved in the dynamic models, but which detector/estimator 31 may have difficulty extracting. For example, the relative height of the obstacle with respect to the radar, or the true azimuth if there is some ambiguity. This set of indirect parameters may be extracted using the elements of the state vector directly or indirectly.

An exemplary indirect parameter may be the elevation $\gamma$ of an obstacle, which can be calculated indirectly from the Doppler shift, $\bar{\omega}$, and the measured azimuth, $\theta$, using the relation: $\cos(\theta) = \cos(\bar{\omega})/\cos(\theta)$. The azimuth $\theta$ and the Doppler shift $\bar{\omega}$ are direct parameters and appear in the state-vector of EKF 36 within the trajectory descriptor. Therefore, parameter extractor 40 may take the two direct parameters and may extract the indirect one.

Another example is the target signature (TS) of the obstacle, which contains, inter alia, the radar cross-section (RCS) at the horizontal and vertical polarized returns, and the numerical description of the target radii within the RDMs. The RCS may be extracted by substituting the magnitude of the return of the obstacle, which is measured by detector/estimator 31, and its position relative to helicopter 20 in the obstacle's RCS model, which is different for the wire and for the pylon.

The objective of classifier 42 may be to decide the obstacle type ('Ground', 'Pylon', 'Wire' or 'false-alarm') based on the output of parameter extractor 40.

Clearly, the most informative parameter for classifier 42 is the type of the dynamic model. Consequently, classifier 42 may first read the type of the dynamic model in the output of parameter extractor 40. This gives the type of the obstacle. However, in many cases, the user might be dissatisfied with this general description and would like to have a more elaborate description of the wire or of the pylon. In that case, classifier 42 might consider other parameters in the output of parameter extractor 40 such as the target signature (TS), and may compare it to a predefined catalogue of wires and pylons. The predefined catalogue might include a list of wires (sorted, e.g., by the number of parallel wires, their arrangement, material and diameters) and pylons (sorted, e.g., by their shape and material), and the TS for each type. Classifier 42 might select the obstacle type whose TS is closest to the TS that was extracted by parameter extractor 40. For example, classifier 42 may use the TS values as features, and then may use any discriminant method to classify the respective obstacle into the four classes, for example, using principal components analysis (PCA).

As mentioned hereinabove, some types of measurements introduce an unavoidable "modulo operation" in the measurement process, which may lead to aliasing of the measurements onto lower values than the true ones. This, for example, occurs in range measurements, when the pulse repetition frequency (PRF) is too high to sample range directly, or in Doppler measurements, when the PRF is too low to sample Doppler frequency directly, or in interferometric azimuth measurements, when the distance between the antennas is too wide to sample the phase difference directly. It is well known that to avoid ambiguity in azimuth, the space between the two antennas should be less than half of the wavelength. However, this is not always possible and ambiguities result.

Figure 10:
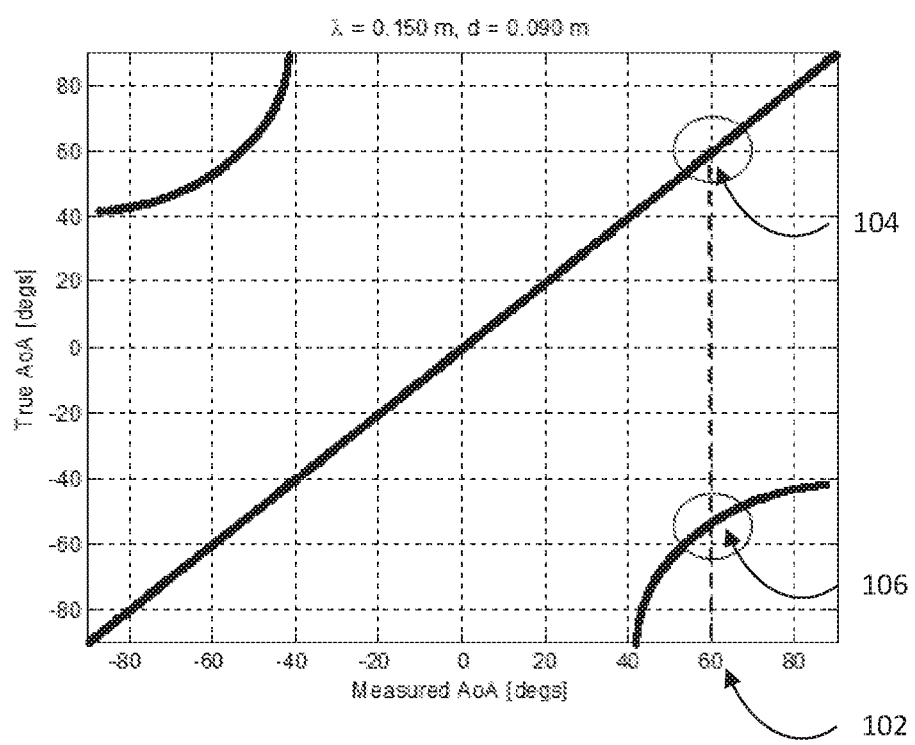
FIG. 10 is a graphical illustration of an ambiguity curve in measuring the angle of arrival (AoA) using interferometry of two antennas, useful in understanding the system of FIG. 6.

Matchmaker 41 may resolve ambiguities by taking the following steps:

For each possible measurement type, a lookup table (LUT) may be prepared which contains all the legitimate values a measured value may take. For example, FIG. 10, to which reference is now made, describes an ambiguity curve in measuring the angle of arrival (AoA) using interferometry of two antennas, where the distance between antennas is 9 cm, which is larger than half of the wavelength of 15 cm. In FIG. 10, the x-axis is the measured azimuth in degrees in the range −90 to 90 degrees, and the y-axis is the true azimuth in degrees in the same range. It will be appreciated that the ambiguity in FIG. 10 implies more than a single possible value for some of the measured values. For example, for an exemplary measured angle of arrival of 60 degrees (labeled with 102), the true azimuth might be either −53.2 degrees (labeled with circle 104) or 60 degrees (labeled with circle 106). In this case, the LUT record for 60 degrees may contain the values of −53.2 and 60. The other records in the LUT may also have multiple values for the true angle, based on the measured azimuth.

From the implementation perspective, the ambiguity LUT might be prepared either by approximating the curves and extracting the possible values by substituting the measured azimuth in each of the curves, or by an array, and interpolating the 2 closest values if the measured azimuth does not implicitly appear in the LUT.

After detector/estimator 31 (FIG. 6) has generated the measurements, each value which might suffer an ambiguity is sought in the ambiguity LUT. If the LUT indicates a single legitimate value (that is, there is no ambiguity and the legitimate value is the measured one), only a single trajectory is initiated. If there is more than a single legitimate value, then for each legitimate value, matchmaker 41 may initiate a different trajectory. If there are several ambiguous measurements, matchmaker 41 may maintain a different trajectory for each ambiguous measurement. For example, if there is an ambiguity in the azimuth and an ambiguity in the range, such that the ambiguity LUT of the azimuth and the ambiguity LUT of the range indicate two valid values for the azimuth and two valid values for the range, matchmaker 41 may initiate four trajectories as there are four combinations of the valid values of the azimuth and the range. The idea is that those trajectories which were maintained for the wrong values will be vanished after a short time as the wrong values of the ambiguous measurements will not match the dynamic model of the obstacle.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A trajectory tracking system for a radar mounted on a moving platform, the system comprising:
    a set of dynamic models, one per expected stationary obstacle type, of an expected apparent trajectory of a point of normal incidence (PNI) per expected stationary obstacle, said stationary obstacle types comprising at least wires, pylons, and clutter, and said apparent trajectory due to motion of said radar towards said expected stationary obstacle;
    a trajectory database to store apparent trajectories for a current set of obstacles being tracked;
    a trajectory handler at least to associate incoming detections to existing apparent trajectories and to update said existing apparent trajectories;
    a parameter extractor to periodically extract parameters from said apparent trajectories; and
    a classifier to classify stationary obstacles associated with said apparent trajectories at least based on said parameters of said trajectories and on associated said dynamic models for said apparent trajectories.

2. The trajectory tracking system according to claim 1 and wherein said trajectory handler comprises:
    a detector/estimator to provide said incoming detection;
    a matchmaker to grow, freeze, kill and start trajectories according to said incoming detections, wherein new trajectories are generated from said dynamic models for incoming detections not associated with an existing apparent trajectory; and
    an extended Kalman filter to update each existing apparent trajectory provided by said matchmaker.

3. The trajectory tracking system according to claim 1 and also comprising a detector/estimator to extract a list of detections of objects from a set of Range-Doppler maps (RDMs).

4. The trajectory tracking system according to claim 1 and wherein each model of said set of dynamic models comprises a state vector comprising at least the position of an obstacle relative to the radar in a 3-dimensional space, a Doppler velocity of the PNI, a polarization of the return wave and an intensity of the return wave.

5. The trajectory tracking system according to claim 2 and wherein said apparent trajectories comprise boolean flags indicating a status of said apparent trajectory.

6. The trajectory tracking system according to claim 2 wherein said parameters are direct parameters measured by said detector/estimator and improved by said extended Kalman filter.

7. The trajectory tracking system according to claim 6 wherein one of said parameters is an azimuth of the obstacle whose final value is determined by said extended Kalman filter as a weighted function at least of the initial measurement and of past measurements via said dynamic model of the obstacle.

8. The trajectory tracking system according to claim 4 wherein said parameters are indirect parameters extracted from elements of said state vector.

9. The trajectory tracking system according to claim 8 wherein said indirect parameters are at least one of: the relative height of the obstacle with respect to the radar, the true azimuth of said obstacle, an elevation of said obstacle and a target signature of said obstacle.

10. The trajectory tracking system according to claim 1 wherein said matchmaker comprises an ambiguity resolver to resolve ambiguities in measurements.

11. The trajectory tracking system according to claim 9 wherein said classifier comprises a parameter reviewer to utilize said target signature against a database of target signatures to determine a class of an obstacle.

12. The trajectory tracking system according to claim 1 wherein said extended Kalman filter comprises an outlier rejection test to reject a measurement update when a measurement deviates from expected values by more than a positive multiple of a standard deviation of the apparent trajectory.

13. A trajectory tracking method for a radar mounted on a moving platform, the method comprising:
having a set of dynamic models, one per expected stationary obstacle type, of an expected apparent trajectory of a point of normal incidence (PNI) per expected stationary obstacle, said stationary obstacle types comprising at least wires, pylons, and clutter, and said apparent trajectory due to motion of said radar towards said expected stationary obstacle;
storing apparent trajectories for a current set of obstacles being tracked;
associating incoming detections to existing apparent trajectories;
updating said existing apparent trajectories;
periodically extracting parameters from said apparent trajectories; and
classifying obstacles associated with said apparent trajectories at least based on said parameters of said apparent trajectories and on associated said dynamic models for said apparent trajectories.

14. The trajectory tracking method according to claim 13 and also comprising:
providing said incoming detection;
growing, freezing, killing and starting trajectories according to said incoming detections, wherein new trajectories are generated from said dynamic models for incoming detections not associated with an existing apparent trajectory; and
updating each existing apparent trajectory provided by said matchmaker.

15. The trajectory tracking method according to claim 13 and also comprising extracting a list of detections of objects from a set of Range-Doppler maps (RDMs).

16. The trajectory tracking method according to claim 13 and wherein each model of said set of dynamic models comprises a state vector comprising at least a position of an obstacle relative to the radar in a 3-dimensional space, a Doppler velocity of the PNI, a polarization of the return wave and an intensity of the return wave.

17. The trajectory tracking method according to claim 14 and wherein said apparent trajectories comprise boolean flags indicating a status of said apparent trajectory.

18. The trajectory tracking method according to claim 14 wherein said parameters are direct parameters from said incoming detections and improved by said updating.

19. The trajectory tracking method according to claim 18 wherein one of said parameters is the azimuth of the obstacle whose final value is determined by said updating as a weighted function at least of the initial measurement and of past measurements via the dynamic model of the obstacle.

20. The trajectory tracking method according to claim 16 wherein said parameters are indirect parameters extracted from elements of said state vector.

21. The trajectory tracking method according to claim 20 wherein said indirect parameters are at least one of: the relative height of the obstacle with respect to the radar, the true azimuth of said obstacle, an elevation of said obstacle and a target signature of said obstacle.

22. The trajectory tracking method according to claim 13 wherein said associating comprises resolving ambiguities in measurements.

23. The trajectory tracking method according to claim 22 wherein said classifying comprises utilizing said target signature against a database of target signatures to determine a class of an obstacle.

24. The trajectory tracking method according to claim 13 wherein said updating comprises rejecting a measurement update when a measurement deviates from expected values by more than a positive multiple of a standard deviation of the apparent trajectory.

* * * * *